US007392253B2

(12) United States Patent
Gursky et al.

(10) Patent No.: US 7,392,253 B2
(45) Date of Patent: Jun. 24, 2008

(54) SYSTEM AND METHOD FOR SECURE FULL-TEXT INDEXING

(75) Inventors: Dennis Gursky, Bothell, WA (US); Kyle G. Peltonen, Issaquah, WA (US); Yevgeniy A. Samsonov, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 445 days.

(21) Appl. No.: 11/072,726

(22) Filed: Mar. 3, 2005

(65) Prior Publication Data

US 2006/0200446 A1  Sep. 7, 2006

(51) Int. Cl.
*G06F 17/30* (2006.01)

(52) U.S. Cl. ............... 707/9; 707/3; 707/8; 707/10; 707/102; 709/218

(58) Field of Classification Search ............... None
See application file for complete search history.

(56) References Cited

U.S. PATENT DOCUMENTS

| 5,182,705 | A | * | 1/1993 | Barr et al. ............... 705/11 |
| 5,659,746 | A | * | 8/1997 | Bankert et al. ............... 707/205 |
| 5,742,807 | A | * | 4/1998 | Masinter ............... 707/1 |
| 5,905,980 | A | * | 5/1999 | Masuichi et al. ............... 707/1 |
| 6,321,334 | B1 | * | 11/2001 | Jerger et al. ............... 726/1 |
| 6,381,602 | B1 | * | 4/2002 | Shoroff et al. ............... 707/9 |
| 6,574,617 | B1 | * | 6/2003 | Immerman et al. ............... 707/1 |
| 6,732,087 | B1 | * | 5/2004 | Hughes et al. ............... 707/3 |
| 7,017,183 | B1 | * | 3/2006 | Frey et al. ............... 726/5 |
| 7,031,954 | B1 | * | 4/2006 | Kirsch ............... 707/3 |
| 7,181,688 | B1 | * | 2/2007 | Umemoto et al. ............... 715/531 |
| 2001/0049706 | A1 | * | 12/2001 | Thorne ............... 707/530 |
| 2003/0074580 | A1 | * | 4/2003 | Knouse et al. ............... 713/201 |
| 2003/0158867 | A1 | * | 8/2003 | Goodwin et al. ............... 707/200 |
| 2003/0177124 | A1 | * | 9/2003 | Sauri ............... 707/10 |
| 2004/0167921 | A1 | * | 8/2004 | Carson et al. ............... 707/102 |
| 2004/0230791 | A1 | * | 11/2004 | Boebert et al. ............... 713/150 |
| 2005/0108200 | A1 | * | 5/2005 | Meik et al. ............... 707/3 |
| 2005/0138110 | A1 | * | 6/2005 | Redlich et al. ............... 709/201 |
| 2005/0288939 | A1 | * | 12/2005 | Peled et al. ............... 705/1 |

FOREIGN PATENT DOCUMENTS

EP   1 182 590 A2   2/2002

OTHER PUBLICATIONS

Andrew Cencini, "Testing a Full-Text Search Wordbreaker Using C#", Dec. 22, 2003, www.sqljunkies.com.*

* cited by examiner

*Primary Examiner*—Christian Chace
*Assistant Examiner*—Mark Andrew X Radtke
(74) *Attorney, Agent, or Firm*—Merchant & Gould P.C.; Ryan T. Grace

(57) ABSTRACT

Documents are indexed in accordance with a process that separates the filtering and word breaking portions of the process so that they are performed under a restricted security setting. When a document is requested by an indexer, the document is retrieved and then passed to the higher security process. The document is then filtered one or more filters and tokenized by one or more wordbreakers under the restricted security setting before being passed to the indexer. The restricted security setting prevents security vulnerabilities from being exploited during the filtering and word breaking processes.

16 Claims, 4 Drawing Sheets

SYSTEM AND METHOD FOR SECURE FULL-TEXT INDEXING

BACKGROUND OF THE INVENTION

Searches among networks and file systems for content have been provided in many forms but most commonly by a variant of a search engine. A search engine is a program that searches documents on a network for specified keywords and returns a list of the documents where the keywords were found. Often, the documents on the network are first identified by "crawling" the network.

For retrieving documents in a crawl, an operation for each document on the network is executed to get the document and populate the index with records for the documents. Security vulnerabilities exist in such a search system. Often, documents coming from the Internet should not be trusted as they may be malicious or specially crafted to expose one of the vulnerabilities. Certain parts of the search and indexing process may have security flaws that expose different risks ranging from private information disclosure to complete takeover of a user's machine.

SUMMARY OF THE INVENTION

Embodiments of the present invention are related to a system and method for secure full-text indexing. The present invention mitigates the risk of information disclosure by moving the filtering and word breaking processes of indexing to a process with a restricted security setting (e.g., a read only security setting). In previous indexing systems, malicious users were able to exploit security flaws of the filter and/or wordbreaker to gain access to confidential information or take over a user's machine. Moving the filter and wordbreaker to a process with a restricted security setting allows the filtering and word breaking processes to be done under higher security without affecting the other processes involving in indexing documents, In accordance with one aspect of the present invention, a process for secure full-text indexing of a document is provided. A document identifier is received from an indexer. A document is retrieved corresponding to the document identifier. The document is processed under a restricted security setting, and the processed document is forwarded to the indexer. Additionally, the document identifier is cross-checked with the indexer before retrieving the document. Furthermore, the process under the restricted security setting is intermittently shut down such that a window of opportunity for breaching security is limited.

In accordance with another aspect of the present invention, a system for secure full-text indexing of a document is provided that includes an indexer, a protocol handler, and a restricted process. The indexer is arranged to build an index, where entries in the index correspond to words of the document. The protocol handler is arranged to retrieve a document from a data source upon a document request received from the indexer. The restricted process is arranged to process the document under a restricted security setting and forward the processed document to the indexer. The restricted process may further comprise a filter that converts the document to pure text, and a wordbreaker that tokenizes the pure text into words.

DETAILED DESCRIPTION

The present invention now will be described more fully hereinafter with reference to the accompanying drawings, which form a part hereof, and which show, by way of illustration, specific exemplary embodiments for practicing the invention. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Illustrative Operating Environment

Figure 1:
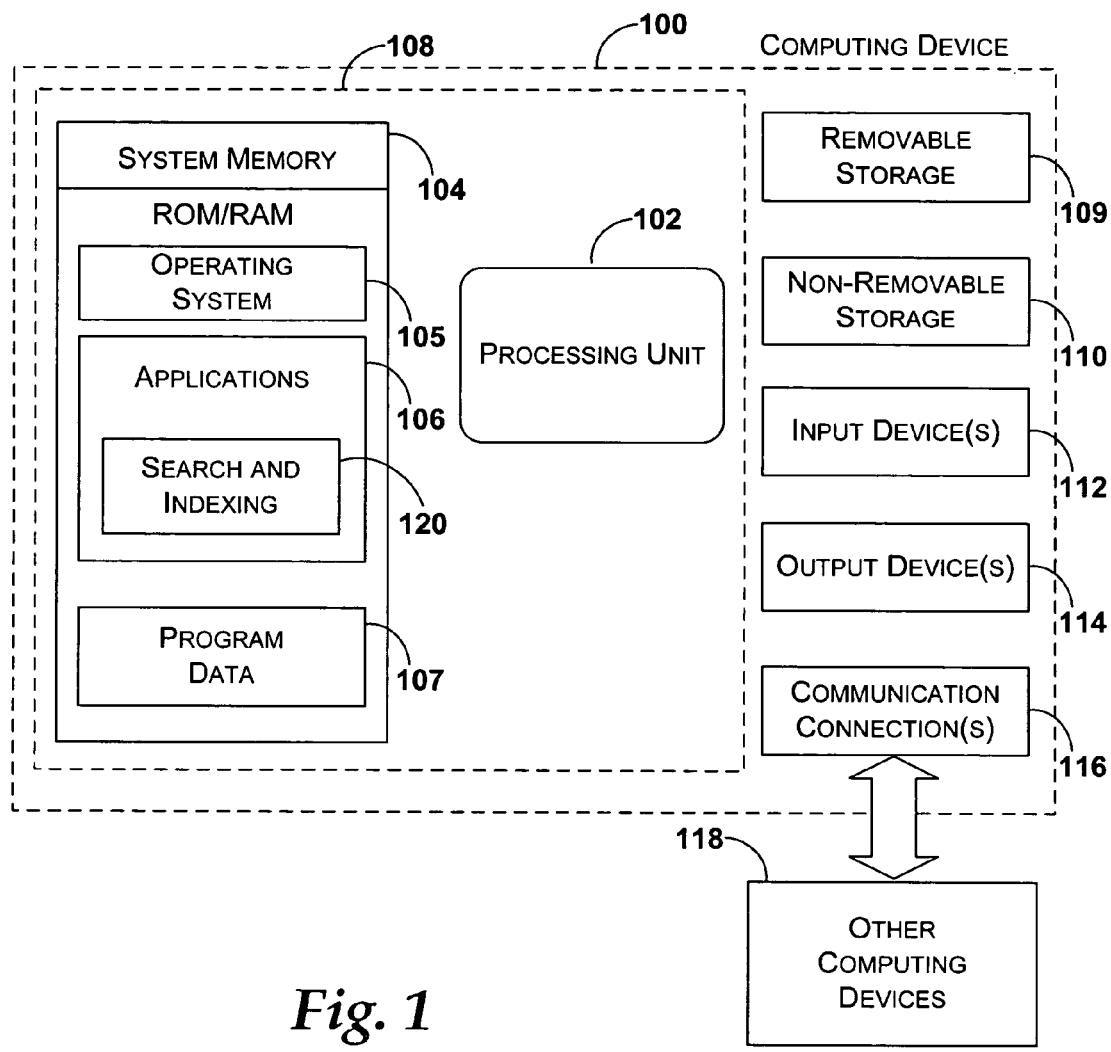
FIG. 1 illustrates an exemplary computing device that may be used in one exemplary embodiment of the present invention.

With reference to FIG. 1, one exemplary system for implementing the invention includes a computing device, such as computing device 100. Computing device 100 may be configured as a client, a server, mobile device, or any other computing device. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 includes a search and indexing application 120 for implementing the functionality of the present invention. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Illustrative Embodiment for Secure Full-Text Indexing

The present invention is related to secure full-text indexing of documents on a network. Throughout the following description and the claims, the term "document" refers to any possible resource that may be returned by as the result of a search query or crawl of a network, such as network documents, files, folders, web pages, e-mail attachments, and other resources.

A question arises on whether documents coming from Internet should be trusted as they may be malicious or specially crafted to expose some vulnerability in a search and indexing system. For example, processing e-mail is especially risky as e-mail can be received without any user's interaction.

In order to index incoming documents, content filtering (extraction of plain text from different formats) and word breaking takes place. Filters may be quite complicated and are known to be error-prone. For example, if filtering happens in a process with access to user's data and buffer overrun (or other security flaw) is exploited in some filter then different threats are possible. The threats of a security breach associated with a filter range from private information disclosure to complete takeover of a user's machine. Wordbreakers are known to be less complicated than filters, but also involve a risk nonetheless.

Figure 2:
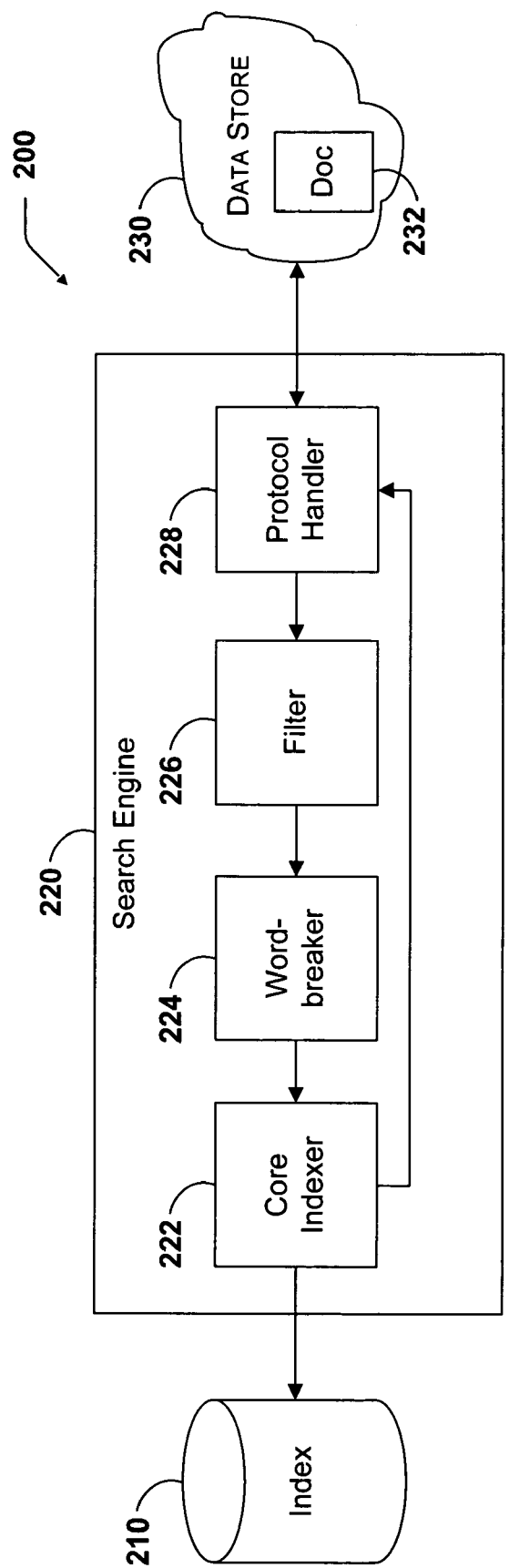
FIG. 2 illustrates a prior art full-text search and indexing system.

FIG. 2 illustrates a prior art full-text search and indexing system. System 200 includes index 210, search engine 220, and data store 230. Search engine 220 further includes core indexer 222, wordbreaker 224, filter 226, and protocol handler 228. In operation, search engine 220 retrieves documents (e.g., 232) from network 230, processes the documents, and indexes the documents in index 210.

Protocol Handler 228 is a software module that is configured to obtain a document from a particular data store. In one embodiment, a different protocol handler may be included for each type of data store accessed by search engine 220. In one embodiment, protocol handler 228 may comprise multiple protocol handlers for handling requests for a variety of document types over multiple data stores. The data stores may include local and shared file systems, the Internet, local area networks, wide area networks, e-mail storage systems, and other storage locations of documents accessible by a search engine. In one embodiment, data store 230 corresponds to a storage file associated with a particular application (e.g., a storage location for an e-mail application).

Filter 226 is a software module that is arranged to convert a document into its pure text equivalent. In one embodiment, filter 226 may comprise multiple filters for filtering the document content rather than the single filter shown. One or more of these filters may be referred to as an "IFilter" or "IFilter interface". An IFilter interface scans documents for text and properties (also called attributes). It extracts chunks of text from these documents, filtering out embedded formatting and retaining information about the position of the text. The IFilter also extracts chunks of values, which are properties of an entire document or of well-defined parts of a document. IFilter provides the foundation for building higher-level applications such as document indexers and application-independent viewers.

Wordbreaker 224 is a software module that is configured to take the pure text output of filter 226 and tokenize the text into words or other units depending on the language of the text. The resulting words or units are dependent on the word-boundary rules for that particular language. For example, variants of the English language primarily consider whitespace as a word boundary. Wordbreakers are often used for a Full-Text index, as well as at query time when a search string is tokenized and those terms are forwarded to index 210 to find matches. In another embodiment, wordbreaker 224 may comprise multiple wordbreaker algorithms for tokenizing the words within the document content. For example, a multiple wordbreakers may be included to handle a data store of documents that is in multiple languages.

Core indexer 222 is a software module that is arranged to build the full-text index (e.g., index 210) from the words or units output from wordbreaker 224. With a built version of index 210, search engine 220 may be used to retrieve documents that correspond to the search terms matched to entries in index 210. Many core indexer types and designs are known. The particular type of core indexer used is not limiting to the present invention described. Therefore, the present invention does not describe in detail the structure of core indexer 222 herein. Many different core indexer configurations may be used without departing from the spirit or scope of the invention.

In operation, core indexer 222 provides an identifier of the document (e.g., 232) to be retrieved from data store 230 to protocol handler 228. For example, if data store 230 is a file system, the identifier may correspond to a file name and path. If the data store 230 is a network, indexer 222 may provide the URL of the document to protocol hander 228. Protocol handler 228 retrieves the document from data store 230 and propagates the document to filter 226. Filter 226 converts the document into pure text and outputs the pure text to wordbreaker 224. Wordbreaker 224 tokenizes the pure text into separate words (or units) and outputs the words to core indexer 222. Core indexer 222 builds index 210 using the words received.

In the prior art system shown, operation of core indexer 222, wordbreaker 224, filter 226, and protocol handler 228, are part of the same process on a particular computing device, or part of multiple processes that share the same security privilege settings. In one embodiment, all processes run in the local security context. However, wordbreaker 224 and filter 226 may have one of many different authors depending on which wordbreaker 224 and filter 226 are used. These components are written by various sources because of the variety of languages and content that may be associated with the documents of data store 230. The variety of authors creates a number of security flaws. For example, a buffer overrun may occur in the context of wordbreaker 224 or filter 226 that allows a malicious document to "take over" the indexing process. The problem is associated with the fact that, in order for protocol handler 228 to access documents, the process needs to run with a certain level of privileges (e.g., read and write). Without prevention, such a security breach may result in dissemination of confidential information or hijacking of a user's computing device.

Figure 3:
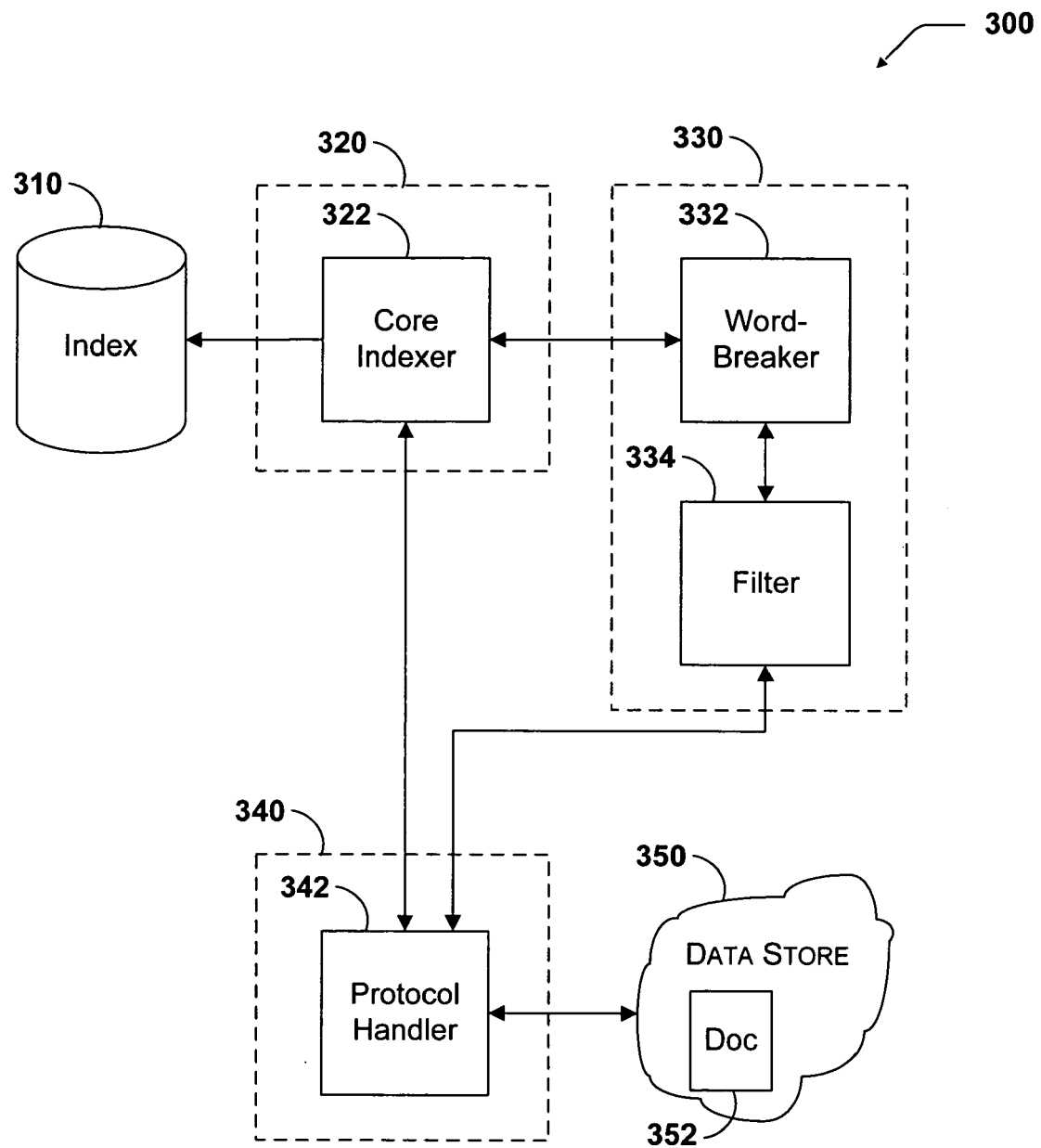
FIG. 3 illustrates a full-text search and indexing system in accordance with the present invention.

FIG. 3 illustrates a full-text search and indexing system in accordance with the present invention. Search and indexing system 300 illustrates a system that addresses the security flaws of previous systems. System 300 is similar to system 200 of FIG. 2 in that it includes an index 310, a core indexer 322, a wordbreaker 332, a filter 334, a protocol handler 342, and a data store 350. The software modules of system 300 are configured similarly to the software modules of system 200 shown in FIG. 2. However, the present invention separates the software modules into three processes (320, 330, 340) rather than running them as a single process. Applying different security settings to the three different processes allows the previous security flaws associated with wordbreaker 332 and filter 334 to be mitigated.

In one embodiment, protocol handler 342 is run according to process 340 and has a security setting applied that allows protocol handler 342 to read from data store 350. This security setting for protocol handler 342 is separate from the restricted security settings applied to core indexer 322 and to wordbreaker 332 and filter 334.

Core indexer 322 is run according to process 320 that has a restricted security setting that prevents core indexer from reading or writing to user data stored in data source 350. Instead, core indexer 322 is limited to a write access privilege to a particular location (index 310).

Wordbreaker 332 and filter 334 are also separated into process 330 that runs the software modules under another restricted security setting. In one embodiment, wordbreaker 332 and filter 334 are under the most restricted security setting, where neither software module is allowed read or write access to any memory locations, including those corresponding to user data. Since the wordbreaker 332 and filter 334 process are run under the restricted security setting, the risk of information disclosure or hijacking of the computing device is mitigated. In accordance with the present invention, the architecture of system 300 also allows additional security measures to be taken that further reduce the risk of a security breach. These additional steps for added security are described below (FIG. 4) in relation to the process for secure full-text indexing that takes advantage of the architecture of system 300.

Figure 4:
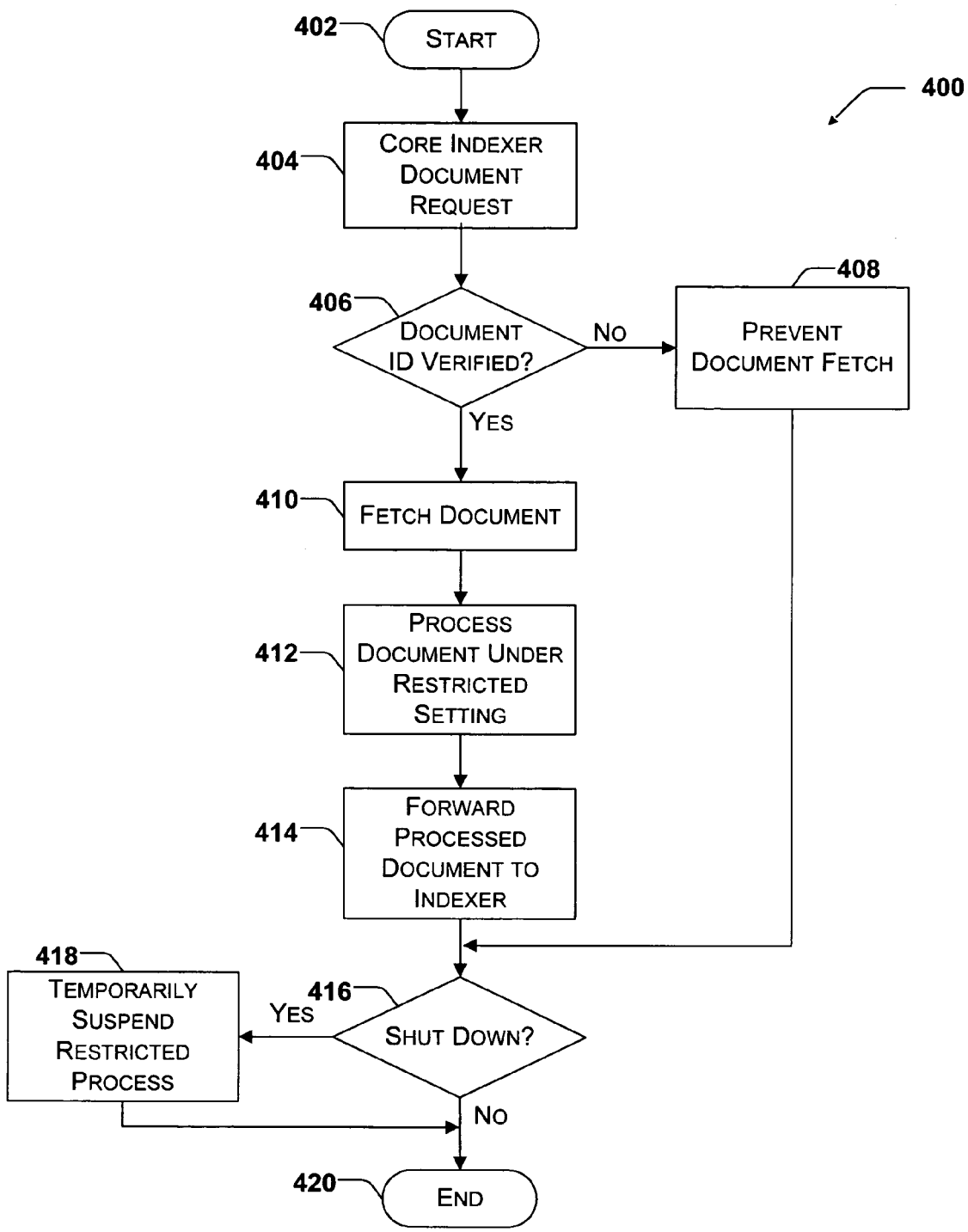
FIG. 4 illustrates an exemplary process for full-text indexing of documents corresponding to the system of FIG. 3, in accordance with the present invention.

FIG. 4 illustrates an exemplary process for full-text indexing of documents corresponding to the system of FIG. 3, in accordance with the present invention. Process 400 starts at block 402, where system 300 shown in FIG. 3 is in a stated where a document is ready to be retrieved for indexing. Processing continues at block 404.

At block 404, core indexer 322 sends a document request through process 330 to protocol handler 342. As stated previously, the document request identifies the document according to some document ID (e.g., URL, file path, etc.). Once the request is sent by core indexer 322, processing continues to decision block 406.

At decision block 406, the document ID is verified by protocol handler 322 as the actual document that core indexer 322 was requesting. Protocol hander 322 transmits a call to core indexer directly to cross-check the document ID. In theory, it is possible that if a malicious attacker were able to hijack process 330, the attacker may be able to siphon user data to another location by enumerating document requests directly from process 330 to protocol handler 342. By checking that the document ID corresponds to the document requested by core indexer 322, core indexer 322 is able to verify the document before it is retrieved. Any non-matches when the cross-check is performed alerts protocol handler 342 that the document request it received was false. If the document ID is verified as coming from core indexer 322, then processing advances to block 410. However, if the document ID is not verified as coming from core indexer 322 during the cross-check, then processing moves to block 408.

At block 408, the fetch of the document by protocol handler 342 is prevented. Additionally, a flag may be set that indicates that restricted process 330 should be timed out since the process may have been hijacked. Processing then advances to decision block 416 where a shut down of restricted process 330 may be performed.

At block 410, since the document ID has been verified, protocol handler 342 fetches the document from data store 350. Once the document is retrieved, the document is forwarded to restricted process 330, and processing continues at block 412.

At block 412, the document is processed under a restricted security setting by filter 334 and wordbreaker 332. As previously stated, the restricted security setting mitigates access to users' data by a malicious attacker that may take over process 330 due to security flaws. Processing continues at block 414.

At block 414, the processed document, now corresponding to tokenized words, is forwarded to core indexer 322. Core indexer 322 is then able to build index 310 from the data received. In one embodiment, index 310 corresponds to a full-text index. Processing then continues at decision block 416.

At decision block 416, a determination is made whether restricted process 330 should be temporarily shut down or suspended. In one embodiment, restricted process 330 is intermittently suspended corresponding to an elapsed time interval (e.g., every few minutes). In another embodiment, restricted process 330 is temporarily shut down because a suspicion exists that restricted process 300 has been hijacked (e.g., when document cross-check fails, see block 406 and 408). If a decision is made that restricted process 330 should be shut down, processing moves to block 418 where restricted process 330 is temporarily suspended. In one embodiment, restricted process 330 is temporarily suspended for a predetermined time interval. In another embodiment, restricted process 330 is suspended for a duration sufficient to evict the hijacker from the process. Shutting down restricted process 300 limits the time that a malicious attacker is in control of the process and thereby limits the length of a security breach. Once restricted process is stopped and restarted, or if no temporary suspension was required, processing advances to block 420 where process 400 may continue with other document requests or move to other processing.

In an additional embodiment, document requests and document retrieval in accordance with process 400 is performed in batches. Stated differently, core indexer 322 forwards a batch of document IDs to protocol handler 342. Protocol handler 342 retrieves the batch of documents and forwards them to restricted process 330 for processing. The batch of documents is then indexed by core indexer 322 as core indexer receives the output of the processed documents from restricted process 330.

In still a further embodiment, the document requests may be forwarded directly to protocol handler 342 instead of propagating through restricted process 330. In such an embodiment, the cross-check steps of block 406 and 408 would not be necessary since protocol handler 342 is able to instantly confirm the validity of the request due to its source.

As previously stated, the invention mitigates the risk of information disclosure by removing direct access to users' data from the filtering and word breaking process and delegating it to another process. Additionally, document identifiers are cross checked to ensure that the requested document is indeed being indexed. Furthermore, the filtering and word breaking process might be periodically killed, so in case it is hijacked despite the restricted security setting (via a buffer overrun or other mechanism), then the time exposure to a users' data would be limited by the process lifetime.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for secure full-text indexing of a document, the method comprising:
   providing an index component, a document handler component, and a document processing component, wherein the document handler component has a first security setting, wherein the document processing component has a second security, wherein the index component has a third security setting;
   receiving, at the document handler component, a document identifier from the index component;
   cross-checking the document identifier received at the document handler component with an identifier associated with the index component to verify that the index component requested the document;
   temporarily shutting down the document processing component when the cross-checking verifies that the index component did not request the document; and
   when the cross-checking verifies that the index component did request the document, obtaining, at the document handler component, a document corresponding to the document identifier, processing the obtained document at the document processing component, and forwarding the obtained processed document to the index component.

2. The computer-implemented method of claim 1, wherein the first security setting associated with the document handler component includes a security setting which provides the document handler component read access to a database of the document and no write access to the database of the document.

3. The computer-implement method of claim 1, wherein the second security setting associated with the document processing component includes a security setting which provides no read access for the document processing component and no write access for the document processing component.

4. The computer-implemented method of claim 1, wherein the third security setting associated with the index component includes a security setting which provides no read access to a database of the document, no write access to the database of the document, and write access to an index database.

5. The computer-implemented method of claim 1, wherein the document processing component includes a filter and a word breaker.

6. The computer-implemented method of claim 1, wherein the document identifier is batched by the index component before being sent by the index component.

7. The computer-implemented method of claim 1, wherein the document handler component receives the document identifier directly from the index component.

8. The computer-implemented method of claim 1, wherein the document handler component receives the document identifier from the document processing component.

9. A computer-readable storage medium having computer executable instructions for secure full-text indexing of a document, the instructions comprising:
   providing an index component, a document handler component, and a document processing component, wherein each of the index component, document handler component and document processing component are separate components and include separate security settings;
   receiving, at the document handler component, a document identifier from the index component;
   cross-checking the document identifier received at the document handler component with an identifier associated with the index component to verify that the index component requested the document;
   temporarily shutting down the document processing component when the cross-checking verifies that the index component did not request the document; and
   when the cross-checking verifies that the index component did request the document, obtaining, at the document handler component, a document corresponding to the document identifier, processing the obtained document at the document processing component, and forwarding the obtained processed document to the index component.

10. The computer-readable storage medium of claim 9, wherein the document processing component includes a filter and a word breaker.

11. The computer-readable storage medium of claim 9, wherein the document identifier is batched by the index component before being sent by the index component.

12. The computer-readable storage medium of claim 9, wherein the document handler component receives the document identifier directly from the index component.

13. The computer-readable storage medium of claim 9, wherein the document handler component receives the document identifier from the document processing component.

14. A system for secure full-text indexing of a document, the system comprising:
   a processor; and
   a memory having computer-executable instructions associated therewith, the computer executable instructions being configured to:
     provide an index component, a document handler component, and a document processing component,
       wherein the document handler component has a first security setting, wherein the first security setting provides the document handler component read access to a database of the document,
       wherein the document processing component has a second security setting, wherein the second security setting provides no read access for the document processing component and no write access for the document processing component, wherein the index component has a third security setting,
       wherein the third security setting provides no read access to the database of the document, no write access to the database of the document, and write access to an index database;
     receive, at the document handler component, a document identifier from the index component;
     cross-check the document identifier received at the document handler component with an identifier associated with the index component to verify that the index component requested the document;
     temporarily shut down the document processing component when the cross-checking verifies that the index component did not request the document; and when the cross-checking verifies that the index component did request the document,
  obtain, at the document handler component, a document corresponding to the document identifier,
  process the obtained document at the document processing component, and
  forward the obtained processed document to the index component.

15. The system of claim 14, wherein the document handler component receives the document identifier directly from the index component.

16. The system of claim 14, wherein the document handler component receives the document identifier from the document processing component.

* * * * *